United States Patent [19]

Steinwachs

[11] Patent Number: 5,087,117
[45] Date of Patent: Feb. 11, 1992

[54] SIDE-MEMBER FOR SPECTACLE FRAMES

[76] Inventor: Peter Steinwachs, Margarethenstr. 8, D-6080 Gross-Gerau, Fed. Rep. of Germany

[21] Appl. No.: 466,323
[22] PCT Filed: Nov. 29, 1988
[86] PCT No.: PCT/EP88/01085
  § 371 Date: May 7, 1990
  § 102(e) Date: May 7, 1990
[87] PCT Pub. No.: WO89/05469
  PCT Pub. Date: Jun. 15, 1989

[30] Foreign Application Priority Data

Dec. 12, 1987 [DE] Fed. Rep. of Germany ... 8716445[U]

[51] Int. Cl.$^5$ .............................................. G02C 5/18
[52] U.S. Cl. ................................. 351/117; 351/122; 351/123
[58] Field of Search ............... 351/114, 117, 122, 123

[56] References Cited

U.S. PATENT DOCUMENTS 460,576 10/1891 Halbe .
1,833,792 11/1931 Pfaus et al. .
4,563,066 1/1986 Bononi .
4,925,291 5/1990 Anger et al. .

FOREIGN PATENT DOCUMENTS 0202556 11/1986 European Pat. Off. .
8336526 11/1985 Fed. Rep. of Germany .
2534387 4/1984 France .

Primary Examiner—Rodney B. Bovernick
Assistant Examiner—J. P. Ryan
Attorney, Agent, or Firm—Burns, Doane, Swecker & Mathis

[57] ABSTRACT

A side member of a spectacles frame comprises an elongate rod and a wider ear part extending rearwardly from the rod. The ear part comprises at least two spars extending substantially parallel in spaced apart relationship to form an opening therebetween. Rear ends of the spars are interconnected. The ear part can be deformed when heated, while providing the wearer with the comfort associated with a wide part.

14 Claims, 1 Drawing Sheet

SIDE-MEMBER FOR SPECTACLE FRAMES

BACKGROUND OF THE INVENTION

The invention concerns a side-member for spectacle frame which comprises a narrow rod terminating in an ear part broadened relative to the rod.

In spectacle frames the spectacle mount is usually connected by means of two hinges with folding side members each.

Each of the two side-members comprises an elongated rod extending to a hook-like ear part. The ear part of the side-member is usually broadered in order to form a surface to be applied against the head of the wearer, behind his ear. During the fitting of a spectacle the ear pieces in particular must be deformed so that they are adapted to the shape of the skull of the wearer, thereby assuring the secure seating of the spectacle, without the formation of pressure points.

The deformation of the end pieces of that spectacle required for the purpose is made difficult by the fact that since the ear parts are usually broad and thus also rigid. Narrow ear pieces, which are also customary, are easier to deform, but apply a higher pressure and may therefore be uncomfortable to wear.

In the case of a known spectacle side-member (EP-A-202 556) the ear piece consists of two spaced apart elongated parts, i.e. an outer, rigid part and an inner strip applied against the ear of the user, said strip being soft and flexible in the fashion of a cord. The lateral pressure applied to the head of the user by the ear piece is concentrated on a small part and is not distributed over a broader ear piece.

In another known spectacle side-member (FR-A-2 534 387), the ear part is over most of its length in the form of a thin metallic inner part with a plastic covering. Only at the outermost end are two openings provided in the rigid inner part, but their length relative to the entire ear part is very small. The plastic coating, on the other hand, has no openings.

In the case of a known side-member for a spectacle frame of the aforementioned type (DE-U-8 336 526) the ear part also has over the major part of its length only a small metallic inner part covered by a soft plastic, in order to provide a softer contact surface against the head of the user. Only at the extreme end of the of the metallic inner part is an eye provided as an opening also covered with a soft plastic. The eye widens the end of the ear piece and facilitates the deformation of the soft plastic material in this area when wearing the spectacle. However, the deformability of the ear piece during the adaptation of the spectacle is hardly affected by this; the expanded contact surface at the head of the user is obtained exclusively by the use of a soft plastic material.

It is therefore the object of the invention to provide a side-member for a spectacle frame of the aforementioned generic type, that is readily deformed for fitting, but which also assures a favorable distribution of the pressure forces.

SUMMARY OF THE INVENTION

This object is attained according to the invention in that the side-member comprises at least two narrow, elongated spars, connected with each other at their ends, but otherwise spaced apart to form therebetween.

The two spaced apart spars distribute the pressure force applied by the spectacle to the head of the wearer in a manner such that the user senses it as distribution over a wide surface of the pressure force. As the cross sectional area of the two spars is relatively small, the end of the ear piece may be easily deformed in any direction, so that optimal adaptation is possible.

Preferably, the two spars are connected at their outer ends to form an uninterrupted flat piece. The formation of this uninterrupted flat piece creates in the area of the outermost end of the side-piece a usually broader uninterrupted supporting surface, which is especially favorable relative to the transfer of force. The fact that this uninterrupted outermost end of the side-member is less deformable than the area divided into the two spars is not a disadvantage, as the flat piece at the end of the side-piece needs to be deformed little or not at all. For the most part, deformation takes place in the area divided into the two spars.

As the deformation required for the fitting of the spectacle must take place not only in the section located behind the ear, but in most cases also in the segment of the side-member located over the ear, it is provided in a further development of the inventive concept that the opening between the two spars extends the transition from the angled end of the side-member into the straight part of the elongated rod and thus into the segment located above the ear.

BRIEF DESCRIPTION OF THE DRAWING

The invention will become more apparent from the following examples of embodiment illustrated in the drawing. In the drawing.

DETAILED DESCRIPTION OF A PREFERRED EMBODIMENT OF THE INVENTION

Figure 1:
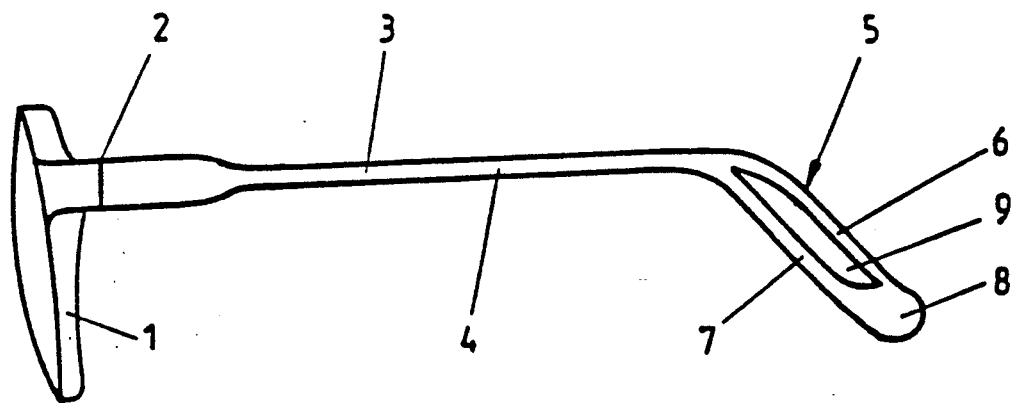
FIG. 1 is a side elevational view of a spectacle frame in accordance with a first embodiment of the invention.
Figure 2:
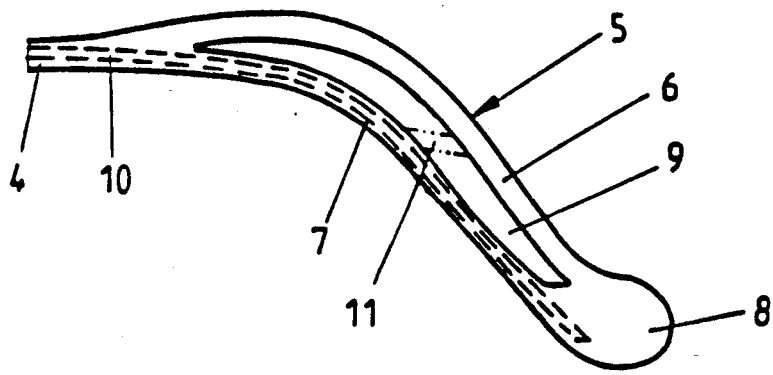
FIG. 2 is an enlarged fragmentary view of an ear part according to a second embodiment of the invention.

The spectacle frame shown in FIG. 1 in a lateral elevation comprises a spectacle mount 1, onto which in the conventional manner two spectacle side-members 3 are articulated, each by means of a hinge 2 (only one side-member being shown). The spectacle side-member 3 consists of an elongated, narrow, essentially straight spectacle rod 4 and a widening end 5 of the side-member, which in the examples according to FIGS. 1 and 2 is slightly angled downward.

The ear piece 5 consists of two small spars 6 and 7, located essentially parallel to and spaced apart from each other or rear. At the outer end of the side-member 3 the two spars 6 and 7 are connected with each other to form a flat piece 8, the width W of which is slightly larger than the width of the end 5 of the side-member in the area of the two spars 6 and 7.

The two spars 6 and 7 are separated by an elongated opening 9, which extends in the example according to FIG. 1 over the entire angled ear part 5 of the side-member to the flat piece 8. The opening 9 tapers off at both of its ends.

In the embodiment according to FIG. 1 the opening 9 extends to the transition between the straight rod 4 and the angled ear part 5. The example according to FIG. 2 differs essentially in that the opening 8' extends farther in the forward direction, i.e. into the straight part of the rod 4'.

The divided configuration of the end 5, which consists of the two thin spars 6 and 7, facilitates the deformation of the ear part 5, so that a simple and still optimal adaptation of the spectacle is possible by the deformation of the ear part 5. In the embodiment according to FIG. 2, the opening 9' includes a front end which is aligned with the rod 4' and which forms an angle relative to the rear end of the opening. Thus, not only the angled part of the ear part 5' located behind the ear of the wearer is deformable, but also the segment extending over the ear.

FIG. 2 also shows a metal insert 10', to rigidize and optionally to fasten the elongated rod 4', extending into the ear part 5' and through the lower spar 7'. In the example according to FIG. 2, it is indicated that the metal insert 10' terminates in the uninterrupted flat piece 8'.

Figure 3:
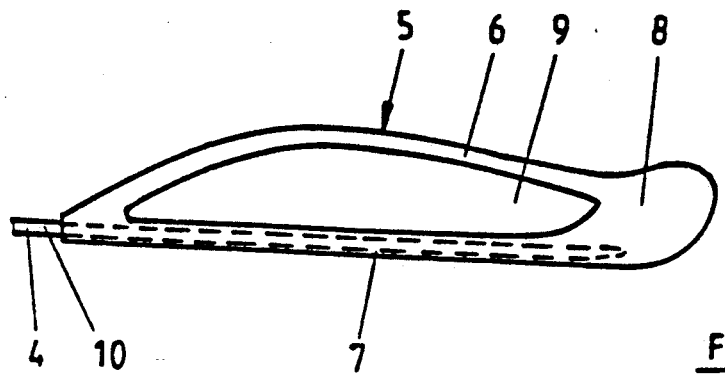
FIG. 3 is an enlarged fragmentary view of an ear part according to a third embodiment of the invention.

FIG. 3 shows an embodiment of an ear part 5', which in contrast to the aforedescribed embodiments extends in an approximately straight line as an extension of the elongated rod 4'. The possibility that the metal insert 10' may form the straight rod 4' without a plastic covering, is also indicated. The metal insert 10' extends through the lower spar 7' into the uninterrupted flat piece 8' at the outer ear piece.

The end piece 5' is made of the conventional plastics also used for the preparation of spectacle frames, which is deformable when heated to be made to conform to the wearer's head.

Instead of the two spars 6, 7 shown, several spars may also be provided, for example three spaced apart spars. In place of the configuration shown with a single uninterrupted opening 9', it is also possible to divide the opening by a web 11' connecting the two spars 6', 7', as indicated by dash-and-dot lines in FIG. 2.

I claim:

1. A side member for a spectacle frame comprising an elongated rod and an ear part extending rearwardly from said rod, said ear part being wider than said elongated rod, and comprising at least two narrow elongated spars formed of an essentially rigid material, said spars being spaced apart to form an elongated opening therebetween and being interconnected at their rear ends, a metal insert extending through at least a lower one of said spars.

2. A side member according to claim 1, wherein said spars are oriented substantially parallel to each other.

3. A side member according to claim 1, wherein the connection between said rear ends of said spars comprises a solid flat piece of said ear part.

4. A side member according to claim 1, wherein said elongated opening tapers off at both of its ends.

5. A side member according to claim 1, wherein said ear part is bent down at an angle from said elongated rod, said opening extending at least to a transition between said elongated rod and said ear part.

6. A side member according to claim 5, wherein said opening includes front and rear ends oriented at an angle relative to one another, said forward end being aligned with said rod.

7. A side member according to claim 1, wherein both said rod and said ear part are straight.

8. A side member according to claim 1, wherein said rod is straight and a lower one of said spars is colinear with said rod.

9. A side member according to claim 1 including a web extending across said opening to interconnect said spars.

10. A side member for a spectacle frame comprising an elongated rod and an ear part extending rearwardly from said rod, said ear part being wider than said elongated rod, and comprising at least two narrow elongated spars formed of an essentially rigid material, said spars being spaced apart to form an elongated opening therebetween and being interconnected at their rear ends, both said rod and said ear part being straight.

11. A side member according to claim 10, wherein a metal insert extends through at least one of said spars.

12. A side member according to claim 11, wherein said metal insert extends through a lower one of said spars.

13. A side member for a spectacle frame comprising an elongated rod and an ear part extending rearwardly from said rod, said ear part being wider than said elongated rod, and comprising at least two narrow elongated spars formed of an essentially rigid material, said spars being spaced apart to form an elongated opening therebetween and being interconnected at their rear ends, said rod being straight and a lower one of said spars being colinear with said rod.

14. A side member for a spectacle frame comprising an elongated rod and an ear part extending rearwardly from said rod, said ear part being wider than said elongated rod, and comprising at least two narrow elongated spars formed of an essentially rigid material, said spars being spaced apart to form an elongated opening therebetween and being interconnected at their rear ends, and a web extending across said opening to interconnect said spars.

* * * * *